United States Patent [19]

Laufman

[11] 3,777,842
[45] Dec. 11, 1973

[54] AIRCAR

[76] Inventor: Harry A. Laufman, 1510 E. Colorado Blvd., Glendale, Calif. 91205

[22] Filed: Apr. 6, 1972

[21] Appl. No.: 241,518

Related U.S. Application Data

[63] Continuation of Ser. No. 24,057, March 26, 1970, abandoned.

[52] U.S. Cl.................. 180/117, 180/120, 114/67 A
[51] Int. Cl............................................. B60v 1/02
[58] Field of Search.................. 180/117, 120, 122, 180/118, 126, 127, 128; 114/67 A

[56] References Cited
UNITED STATES PATENTS

| | | |
|---|---|---|
| 3,259,097 | 7/1966 | Van Veldhuizen et al. .. 180/126 UX |
| 3,332,389 | 7/1967 | Van Veldhuizen et al. .. 180/126 UX |
| 2,364,676 | 12/1944 | Warner ........................ 180/120 UX |
| 3,285,537 | 11/1966 | Whittley ........................ 180/120 X |
| 3,291,237 | 12/1966 | Hopkins et al...................... 180/127 |
| 3,292,721 | 12/1966 | Dobson............................. 180/120 |
| 3,302,602 | 2/1967 | Korganoff....................... 180/120 X |
| 3,318,404 | 5/1967 | Hopkins et al...................... 180/122 |
| 3,387,685 | 6/1968 | Fresh et al...................... 180/127 X |
| 3,463,263 | 8/1969 | Winter................................ 180/117 |
| 3,467,213 | 9/1969 | Walker ............................. 180/120 |
| 3,468,394 | 9/1969 | Winter................................ 180/117 |
| 3,117,645 | 1/1964 | Cockerell........................... 180/118 |

Primary Examiner—Kenneth H. Betts
Assistant Examiner—John McCormack
Attorney—J. B. McGuire

[57] ABSTRACT

A vehicle having an air intake system at the forward end thereof, which directs a portion of the ingested air downwardly to fill a pliable doughnut-shaped skirt extending around the vehicle; the air pressure then allows air to move under the skirt so as to lift the entire vehicle. The remaining portion of the air is directed through the vehicle and out the after end thereof for propulsion and the direction of movement of this air is controlled by a plurality of rudders so that the vehicle may be turned or moved in reverse. The relative volumes of air directed through the vehicle and out from under the vehicle may be adjusted by an angularly movable plate positioned relative to an engine and a propeller.

9 Claims, 9 Drawing Figures

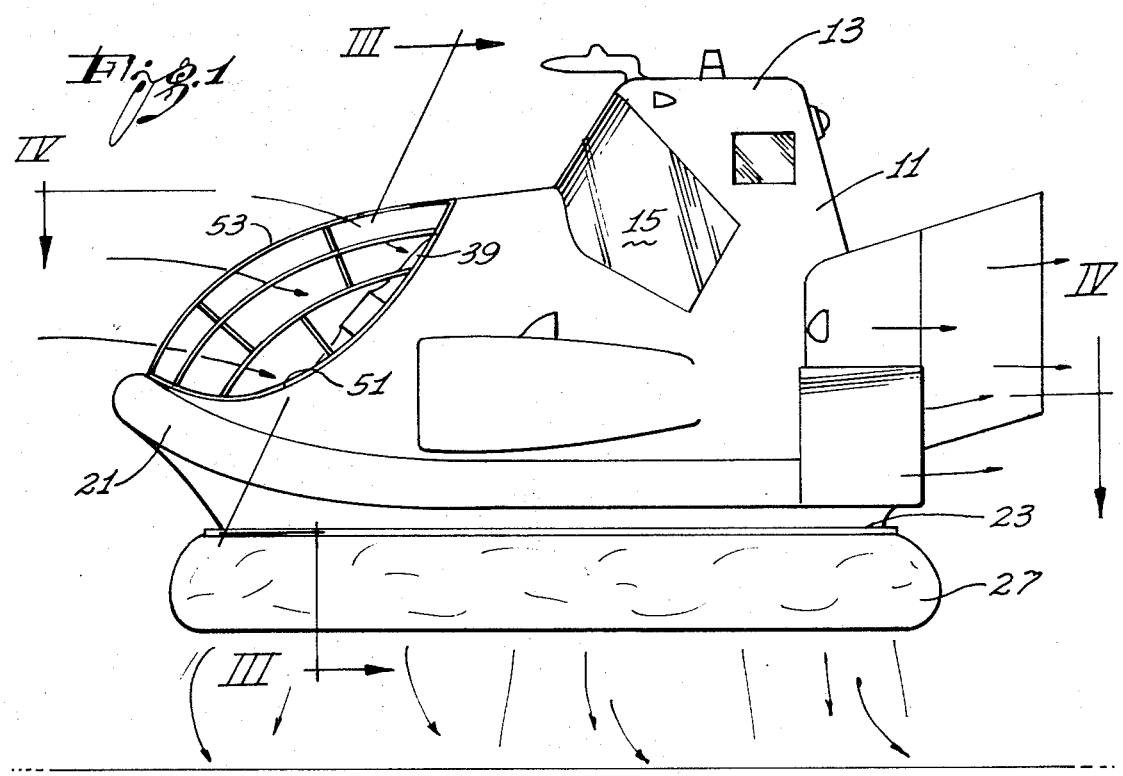
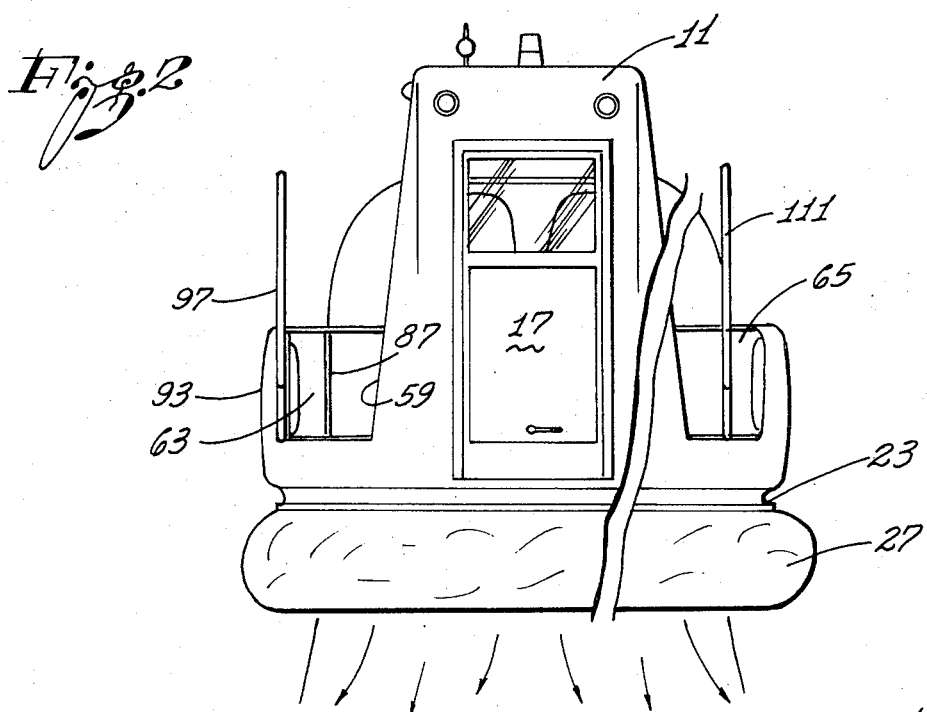

INVENTOR.
Harry A. Laufman

ATTORNEYS

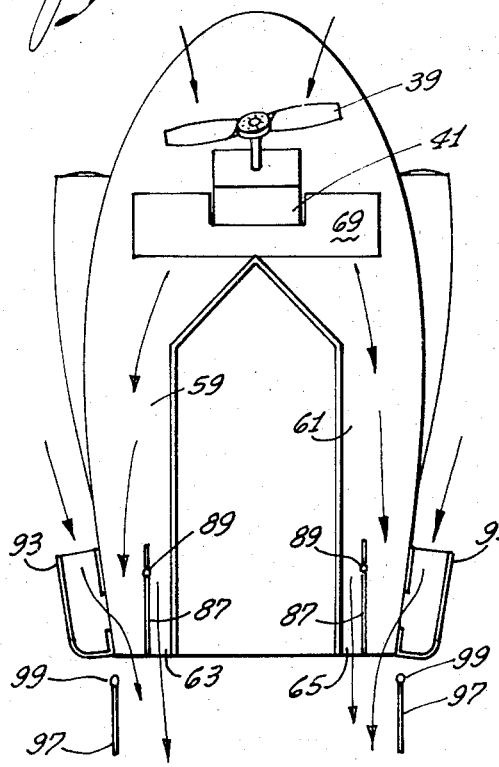
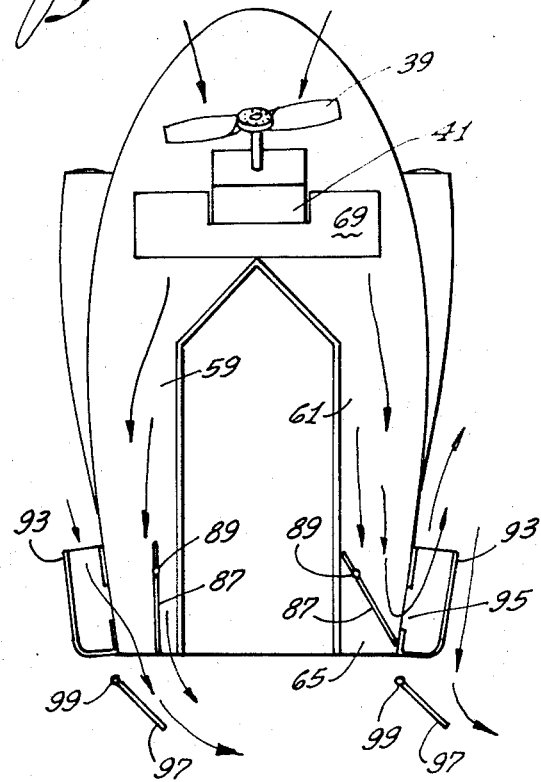
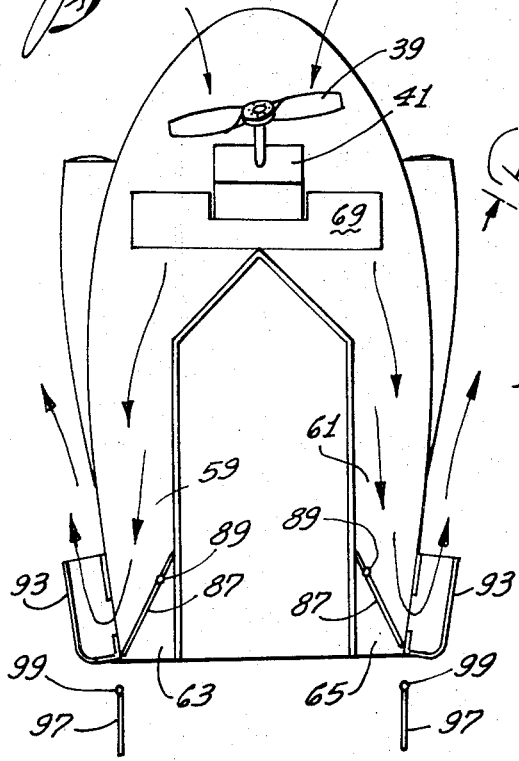
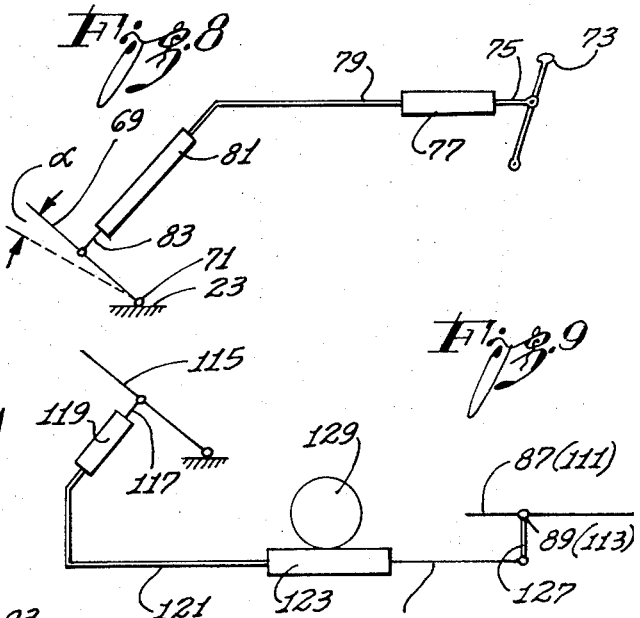

AIRCAR

This is a continuation of application Ser. No. 24,057, filed Mar. 26, 1970 now abandoned.

BACKGROUND OF THE INVENTION

This invention relates to an aircar or ground-effect vehicle of the type in which air is forced from an air-cushion chamber beneath the vehicle body and the chamber is continuously supplied with air to support the vehicle above the ground so that there is no frictional resistance to travel. A single air movement system directs air to the air cushion as well as to the vehicle motivation system. As used here, the term "vehicle motivation system" is meant to include the vehicle stearing and directional control system. Such vehicles may be used on land in on-and-off highway situations as well as over water.

Many vehicles have now been developed which may generally be described as air-cushion vehicles, an example of which has been shown in U. S. Pat. No. 3,401,766 to Laufman et al.

As disclosed in that patent, such vehicles are normally provided with flexible skirts which are continuous around the lower peripheral edge of the body shell and depend from the shell to confine an air-cushion which lifts the entire vehicle. As the pressure of the air-cushion builds up, it causes the entire vehicle to be raised from the ground or other surface over which the vehicle passes so that its movement is effectively frictionless relative to that surface.

The air pressure source in the vehicle also is used to push air through hollow portions of the vehicle shell for motivation thereof.

Most of the air-cushion vehicles previously devised have been inefficient in their movement of air by means of a fan or other device in that no control is exercised over the amount of air delivered to either the air cushion or the motivation structure. As a result, the vehicle is raised a distance from the surface which is inversely proportional to vehicle speed since greater quantities of air can be delivered to the air-cushion only by closing the motivation structure to some extent.

Many other vehicles have been devised to solve this problem by utilizing two fans-one to create and maintain the air-cushion and the other to provide motivation force. Obviously, this is extremely expensive in view of the additonal cost of the second fan, the additional fuel utilized by the driving of the second fan, and the added weight of the vehicle caused by the second fan as well as by the additional quantities of fuel which must be carried to power that fan.

In the prior art vehicles utilizing a single fan for both the air cushion and motivation, it has been necessary for the fan to be driven by a relatively high powered engine in order to perform both functions. In most such vehicles, the flexible skirt has been straight-sided or slightly curved, from top to bottom, requiring a relatively high air pressure within the air-cushion to raise the vehicle and maintain it above the surface.

The prior art vehicles have also been deficient in their operating capabilities in that the vehicles can be driven straight ahead or turned to the right or left, but cannot be driven in reverse.

Due to these and ype of deficiencies, aircars or air-cushion vehicles have been relatively expensive to produce and maintain and have not yet enjoyed a wide acceptance. In view of the necessity for a new type of vehicle to be utilized in undeveloped areas with few or no highways, and in which highways cannot be built due to financial or ecological factors, such as the north slope of Alaska, it has become imperative to produce an air-cushion vehicle which is inexpensive to produce and maintain while being simple in form and operation. In other words, it has become necessary to produce an aircar which obviates all of the above-described deficiencies found in the prior art vehicles.

SUMMARY OF THE INVENTION

According to the concepts of this invention, a device is provided which controls the volume of air delivered to the air-cushion and the volume delivered to the motivation system in accordance with the desires of the vehicle operator and without requiring mechanical operation of any part of the motivation system. As broadly conceived, this air dividing system could comprise a plurality of components but, in its simplest form, comprises a divider plate which is pivotable about an axis and which is mounted relative to the engine and fan so as to positively direct distinct portions of the ingested air to the cushion and motivation system. ithin the skirt as well as The vehicle is provided with a skirt which resembles a doughnut having an open side on the interior and in which air is captured. Air spillage from that captured within the skirt as well as air coming directly from the fan lifts the vehicle by creating a pressure between a relatively large area at the bottom of the skirt and the surface over which the vehicle travels. The particular shape of the skirt provided allows the required air pressure to create an effective air-cushion to be far smaller than is required in prior art machines. In turn, the size of the engine which drives the intake fan or propeller can be reduced without sacrificing the vehicle speed capabilities.

The skirt is manufactured from a very flexible material and, since the air therein is at a relatively low pressure, it will easily deform and traverse minor obstacles in the path of the vehicle.

Additionally, structure has been provided to form a simplified engine and fan mounting system so that the engine is easily accessible for maintenance and repair. In essence, the mounting system comprises an inverted U-shaped frame which is pivoted to the vehicle shell at the ends of the frame and is removably fastened to the shell at the intermediate or channel portion thereof. The engine may be mounted on the frame legs and the entire mounting may be angularly positioned within the shell so as to properly angularly relate the fan propeller to the divider plate.

A plurality of directional control rudders may be provided on the vehicle within the motivation system so as to allow the vehicle to be turned to the right or left or moved in the rearward direction.

If desired, the directional control 774 which are mounted within the air flow path coming 178 the fan may be pivoted nearer their leading edges than their trailing edges so that the air flow tends to move the rudders to positions which are parallel to the flow path. Therefore, when a hydraulic system is actuated to change the direction of the rudders in the air flow path, so as to alter the direction of vehicle travel, a mere release of the hydraulic system will allow the vehicle direction to return to a straight-ahead path without further action by the vehicle operator.

A vehicle formed in accordance with the concepts of this invention will utilize a relatively low-power engine without loss of vehicle speed and produce a relatively low pressure air cushion which may be controlled so as to alter the vehicle height over the surface being traveled at the will of the operator.

Additionally, the vehicle will be inexpensive to manufacture and maintain since the smaller engine will require less fuel and may be easily put into and removed from the vehicle during manufacture and maintenance periods.

Other advantages, objects, modes, and embodiments of this invention will become apparent to those skilled in the art by reference to the Detailed Description and accompanying drawings which illustrate what is presently considered to be a preferred embodiment of the best mode contemplated for utilizing the novel principles of the invention as set forth in the appended claims.

BRIEF DESCRIPTION OF THE DRAWINGS

FIG. 1 is a side elevation of an aircar formed according to the present invention;

FIG. 2 is a rear elevation of the vehicle shown in FIG. 1, with an alternate embodiment of the rudder mounting illustrated on the right-hand side of the vehicle;

FIGS. 5-7 are schematic illustrations of the vehicle motivation system illustrating the position of the structure during various modes of operation thereof;

FIG. 8 is a schematic illustration of a hydraulic system for operation of the air divider apparatus; and FIG. 9 is a schematic illustration of a hydraulic system which may be utilized to operate the air-stream rudders.

DETAILED DESCRIPTION

Figure 3:
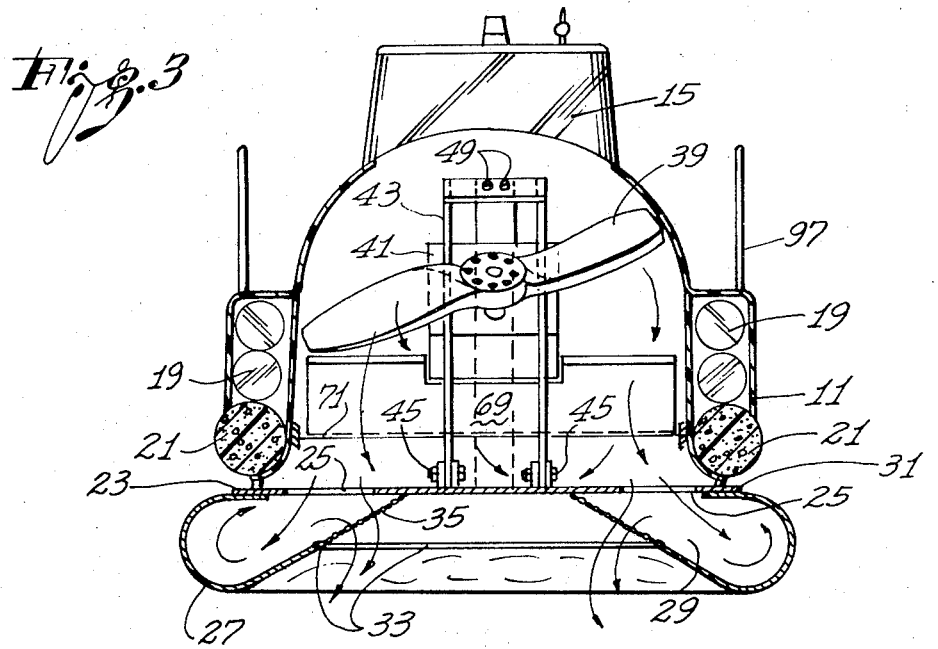
FIG. 3 is a sectional view of the vehicle shown in FIG. 1, taken along a line III—III thereof.

Referring now to FIGS. 1-4 in greater detail, there is shown an aircar having a body 11 which is provided with suitable structural details such as a cockpit 13, a windshield 15, a door 17, headlights 19, etc. A member 21 extending around a major portion of the body 11 serves as both a bumper and a float to keep the vehicle from sinking if it should stop while over a body of water.

The body 11 is mounted on a platform 23 having an aperture 25 therein through which air is passed for formation of an air-cushion beneath the vehicle. A flexible, doughnut-shaped skirt 27 is mounted on the vehicle so as to form a distorted U-shaped device having a continuous opening 29 throughout its entire circumference. The skirt is formed by suitably fastening the entire periphery of one edge thereof to the platform as at 31 and by supporting the entire periphery of the other edge thereof from a support member 33 which is suspended from the platform 23 by any suitable means such as chains or lines 35.

Air is ingested into the vehicle by a fan or propeller blade 39 which is driven by an engine 41 mounted on a tiltable support frame 43. The support frame generally comprises a U-shaped member which is inverted so that the legs at the open end of the frame are pivotally mounted to the platform 23 by any suitable means such as pivot pins 45. If desired, the legs of the frame may also be attached to the platform by additional fastening means such as bolts 47 so as to reduce the possibility of the support frame becoming detached from the platform during operation. The channel-portion of the U-shaped frame 43 is attached to the body 11 by suitable means such as bolts 49. When it is desired to work on the engine, bolts 49 and 47 may be removed and, by grasping and pulling on the upper end of the frame, the entire support may be pivoted about the pins 45 so as to allow the engine and propeller to be pivoted forward for easy access.

The propeller 39 and its related structure are mounted on the forward portion of the vehicle within an opening 51 over which a protective frame 53 may be placed so that air may be drawn through the opening. The frame will prevent foreign matter from contacting the propeller to obviate the possibility of damage or injury.

As air is pulled into the opening 51 by the propeller 39, the angle of the propeller axis, as determined by the angular mounting of the frame 43, will tend to move the air downwardly and rearwardly. Air moving downwardly will pass through the opening 25 in the platform 23, fill the skirt by passing through opening 29 therein, and create an air-cushion beneath the platform and the skirt by passing through the area within the support 33. When the skirt becomes filled, the air therein will tend to either become static or to spill over the inner edges and through the support as it is replaced by incoming air. As the air pressure in the area beneath the platform 23 builds up, it will soon attain a pressure which raises the vehicle above the surface upon which it has been resting a sufficient distance to allow air to pass under the lower portion of the filled skirt. The distance which the vehicle will be raised is determined by the air pressure in the air-cushion. In other words, the more air which is put into the air-cushion, the higher the vehicle will rise.

Air which does not pass through the aperture 25 in the platform will pass through a symmetrical pair of air tunnels 59 and 61 on opposite sides of the cockpit and be directed from the tunnels through openings 63 and 65 respectively for motivation of the vehicle through the well-known reaction principle.

The respective percentages of the ingested air directed to the air-cushion and to the motivation system may be controlled by the operator by means of a divider plate 69 which may be pivoted about any suitable means such as a hinge 71. As shown in FIG. 8, the operator can control the angular position of the plate 69 by any suitable device such as a lever 73 which actuates a piston rod 75 attached to a piston within a cylinder 77. A change in pressure in the head end of the cylinder 77 will be transmitted, through a line 79, to a second cylinder 81 which causes a similar but opposite reaction on a piston rod 83. Thus, if the lever 73 is pivoted forwardly, the plate 69 will move in the counterclockwise direction about the pivot hinge 71; if the lever is pivoted rearwardly, the plate will pivot in the clockwise direction about the hinge. Thus, by moving the lever and positioning it in a desired position, the operator can adjust the angular position of the plate 69 so as to determine the relative volumes of air delivered to the air-cushion and the motivation system. As the plate 69 is pivoted in the clockwise direction, greater quantities of air will be delivered to the air-cushion, resulting in a pressure increase which will cause the vehicle to be raised from the surface.

If desired, the divider plate could be of such a size and pivotable to such an extent that all of the air would enter the air-cushion, raising the vehicle the maximum extent while preventing movement thereof. The downward or counterclockwise movement of the plate should be limited, however, since if all of the air were driven through the motivation system, the vehicle would not be raised and the skirt could be severely damaged if the vehicle should move. However, within the foreseen limits of pivotability of the plate 69, the operator could control the vehicle from a full stop at a maximum lift condition to maximum speed at a minimum lift condition.

Figure 4:
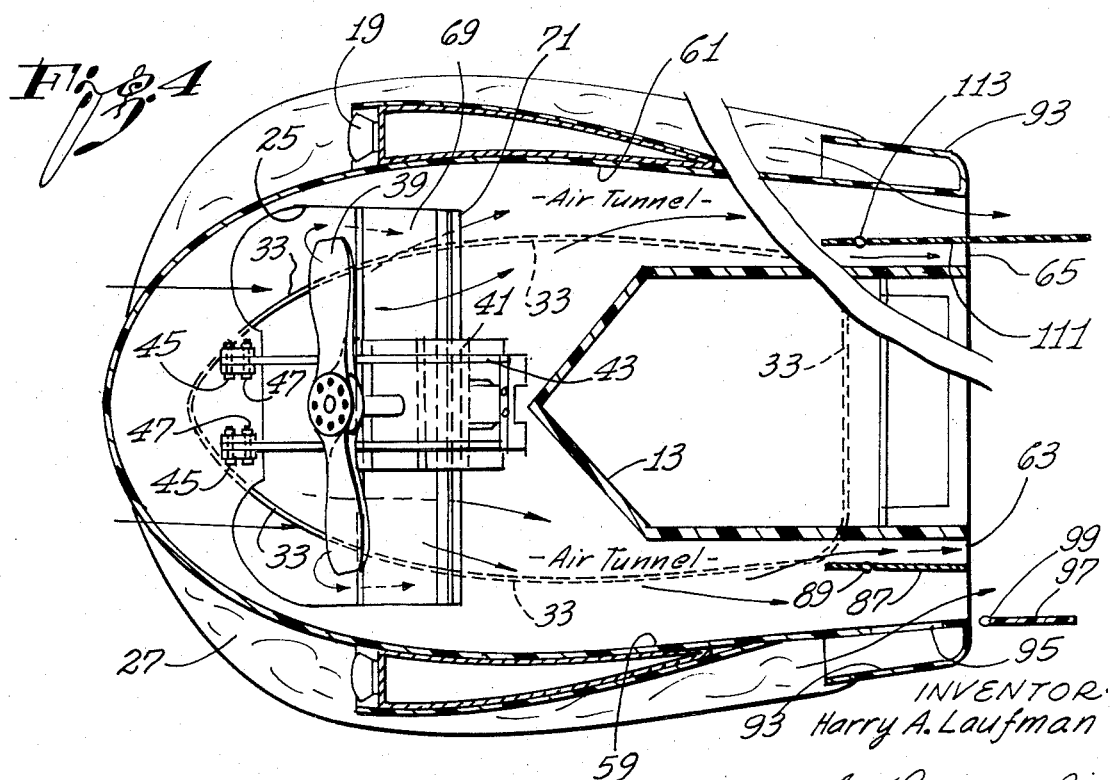
FIG. 4 is a top sectional view of the vehicle, taken along a line IV—IV of FIG. 1, but with the right, rear portion of the vehicle illustrating the alternate rudder mounting shown in FIG. 2.

Referring now to FIG. 4, it can be seen that air passing through the air tunnel 59 will be controlled by a tunnel rudder 87 which is pivotable about a vertical pivot point 89. Since the pivot 89 is positioned in front of the vertical center line of the rudder, air movement past the tunnel rudder will tend to maintain the rudder parallel to the normal air flow direction. An air scoop 93 on the side of the vehicle provides for the passage of air through the scoop and through an opening 95 situated between the tunnel 59 and the scoop. The venturi effect of air passing through tunnel 59 and out the opening 63 causes additional air to be pulled into the tunnel through the air scoop and the opening 95. As the air leaves the opening 63, it passes across a vertical surface of a main rudder 97 which pivots about a vertical pivot 99 mounted on the vehicle. Rudder 97 may be turned about the pivot by any suitable operator-controlled means such as a steering wheel within the cockpit.

The provision of the tunnel rudder 87 and the main rudder 97 provide two distinct devices which may be used individually or simultaneously to control the turning of the vehicle and, specifically, to alter the turn radius and turn speed. Identical structure may be mounted on the opposite side of the vehicle in symmetrical relationship and the main rudders may be linked together for simultaneous turning as required by the operator.

However, as shown in FIGS. 2 and 4, an alternate rudder system has been provided wherein a single rudder 111 pivots about a vertical pivot 113 and, in actuality, combines the features of the tunnel rudder 87 and main rudder 97 previously described. The use of this single rudder will provide comparable steering control of the vehicle while reducing the number and complexity of the control systems required since only one control system will be necessary to turn the rudder 111.

In order to turn the tunnel rudder 87, or the single rudder 111, a control system has been illustrated in FIG. 9 comprising a foot-operated pedal 115 which may be utilized to drive a piston rod 117 into a cylinder 119 against the force of a spring (not shown). An increase in pressure in the head end of the cylinder 119 will be sensed, by means of a line 121, in a second cylinder 123 which may be properly mounted so that a piston rod 125 extending therefrom will tend to turn the rudder about its pivot by means of a link 127. If desired, an accumulator 129 may be provided to cooperate with the cylinder 123 so as to increase the pivoting force exerted on the rudder.

Referring now to FIGS. 5-8, a vehicle has been illustrated in schematic form to indicate how it can be turned and driven in reverse. As illustrated, the vehicle has been provided with two tunnel rudders 87 and two main rudders 97 which are symmetrically mounted relative to the vehicle center line. As shown in FIG. 5, air entering the tunnels 59 and 61 will move past both the right and left tunnel rudders 87 and the air leaving the openings 63 and 65, together with air passing through the air scoops 93 in the manner previously described, will pass across the vertical surfaces of the main rudders 97. In this condition of operation, the vehicle is being driven in the forward direction and no turn is being called for by the operator.

In FIG. 6 the operator has depressed the pedal 115 controlling the right tunnel rudder 87 so that it pivots about its vertical pivot 89 and effectively closes the opening 65 by extending across the width of the tunnel in the manner shown. Air passing through the tunnel 61 is then forced out the right opening 95 so that it must pass through the air scoop 93. The air leaving the air scoop will cause the rear of the vehicle to move in the clockwise direction about the turning point or center of gravity of the entire vehicle due to the reaction which occurs as the air leaves the scoop.

If the operator has also operated the main rudders 97 for a right turn, air passing through the left tunnel 59 and the left air scoop 93 will also impinge against the left main rudder 97 so as to add to the turning force.

If a left-hand turn is desired, a similar operation of the left tunnel rudder 87 may be accomplished. It should be noted that when a turn is called for by use of the tunnel rudders, only the tunnel rudder on the side to which the turn is to be made is actuated by the operator. It will also be realized, of course, that a turn could be executed merely by pivoting the main rudders 97; a turn executed in this manner would, of course, have a much larger turn radius.

The use of the duel main rudders serves an additional function in that the vehicle can be driven along a true course and the main rudders may be turned slightly so as to compensate for the wind which might otherwise drive the vehicle off course. This action is similar to that used to control the direction of motion of an airplane since the raising of the vehicle from the ground eliminates all friction therebetween and the direction and velocity of the wind must therefore be taken into account.

Referring now to FIG. 7, it can be seen that when the operator depresses the pedals 115 for both the right and the left tunnel rudders 87, air passing through the tunnels 59 and 61 is forced out through the respective air scoops since the openings 63 and 65 have been closed as illustrated. This causes all of the air in the tunnels to be forced through the openings of the air scoops 93 and the well-known reaction principle forces will cause the vehicle to be very effectively slowed, stopped, and/or moved in "reverse."

Therefore, with the structure now clearly described, the applicant has provided a new and improved concept in the vehicle art which yields true advances in that art due to the simplicity of design, efficiency of operation, and economies inherent in production and maintenance. Many further modifications and alterations of the illustrated embodiment, as well as other embodiments of the concepts of this invention, will be apparent to those skilled in the art without exceeding the scope of the invention, wherefore what is claimed as the invention is:

I claim:

1. An air-cushion vehicle comprising
   a platform-like member,
   a body fixed on said platform-like member and having
      an air intake opening,
      at least one air outlet opening at the rear end thereof, and
      means for directing air from said intake opening to said at least one outlet opening,
   a fan in said intake opening for drawing air into and through said intake opening,
   a skirt attached to the underside of said body and having
      a first peripheral edge attached to said body about the lower, outer periphery of said body and
      a second peripheral edge,
   means for supporting said second peripheral skirt edge at a position substantially radially inside of and below the outer periphery of said body, and
   means in said body for passing a portion of the air drawn through said intake opening into said skirt between said peripheral edges thereof, through said support means, and beneath the lower extremity of said skirt to form a cushion of air of sufficient pressure to lift the vehicle comprising
      an aperture of predetermined size in said platform-like member and situated to receive air driven by said fan and
      a movable divider plate mounted on said platform-like member to direct a portion of the air drawn by said fan through said aperture and to direct the remainder of the air drawn by said fan through said air directing means.

2. The vehicle of claim 1 including
   means for moving said divider plate relative to said platform-like member to control the relative volumes of air directed through said aperture and said air directing means.

3. The vehicle of claim 1 including
   means in said air directing means for turning the air passing therethrough and for closing said at least one outlet opening.

4. The vehicle of claim 3 including
   means on said body for directing the air passing through said air directing means toward the front of the vehicle on the outside thereof when said at least one outlet opening is closed by said air turning means.

5. The vehicle of claim 1 including
   first rudder means in said air directing means for controlling the direction of travel of the vehicle.

6. The vehicle of claim 5 including
   second rudder means mounted on said body for controlling the direction of travel of the vehicle.

7. The vehicle of claim 1 including
   means for controlling the relative volumes of intake air moved through said directing means and said passing means in response to an operator initiated signal to move said divider plate.

8. An air-cushion vehicle comprising
   a body having
      an air intake opening,
      at least one air outlet opening at the rear end thereof, and
      means for conducting air from said intake opening to said at least one outlet opening,
   a fan in said intake opening for drawing air into and through said intake opening,
   a skirt attached to the underside of said body about the periphery thereof,
   means for directing a portion of the fan-drawn intake air beneath said body to form an air-cushion thereunder to raise the vehicle from the underlying surface,
   means for dividing the volume of fan-drawn intake air between said at least one outlet opening and said air-cushion forming means,
   means for altering the division of the volume of air,
   rudder means mounted in said means for conducting air to said at least one outlet opening,
   air scoop means on the sides of said body having
      an opening therein through which air is drawn into said air conducting means intermediate said intake opening and at least one outlet opening, and
   means for actuating said rudder means to close said at least one outlet opening and force air, passing through said means for conducting air from said inlet opening to said at least one outlet opening, out through said air scoop means.

9. The vehicle of claim 8 including
   an engine for driving said fan and
   means for pivotally mounting said fan and said engine at a predetermined angle within said intake opening.

* * * * *